Figure 1:
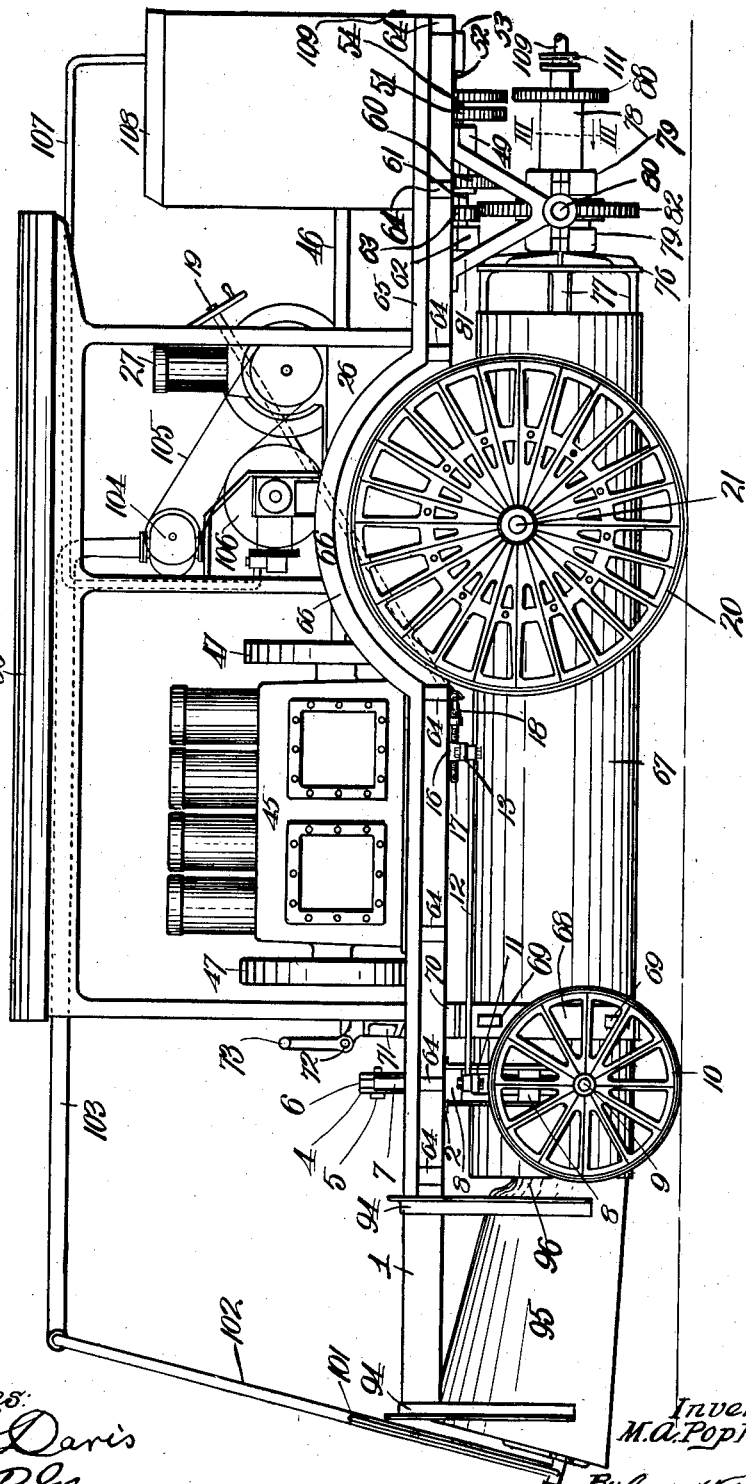

M. A. POPKESS.
ROAD MAKING MACHINE.
APPLICATION FILED JUNE 28, 1909.

1,062,113.

Patented May 20, 1913.
9 SHEETS—SHEET 1.

Witnesses:
W. F. Davis
Frank R. Elon

Inventor:
M. A. Popkess.

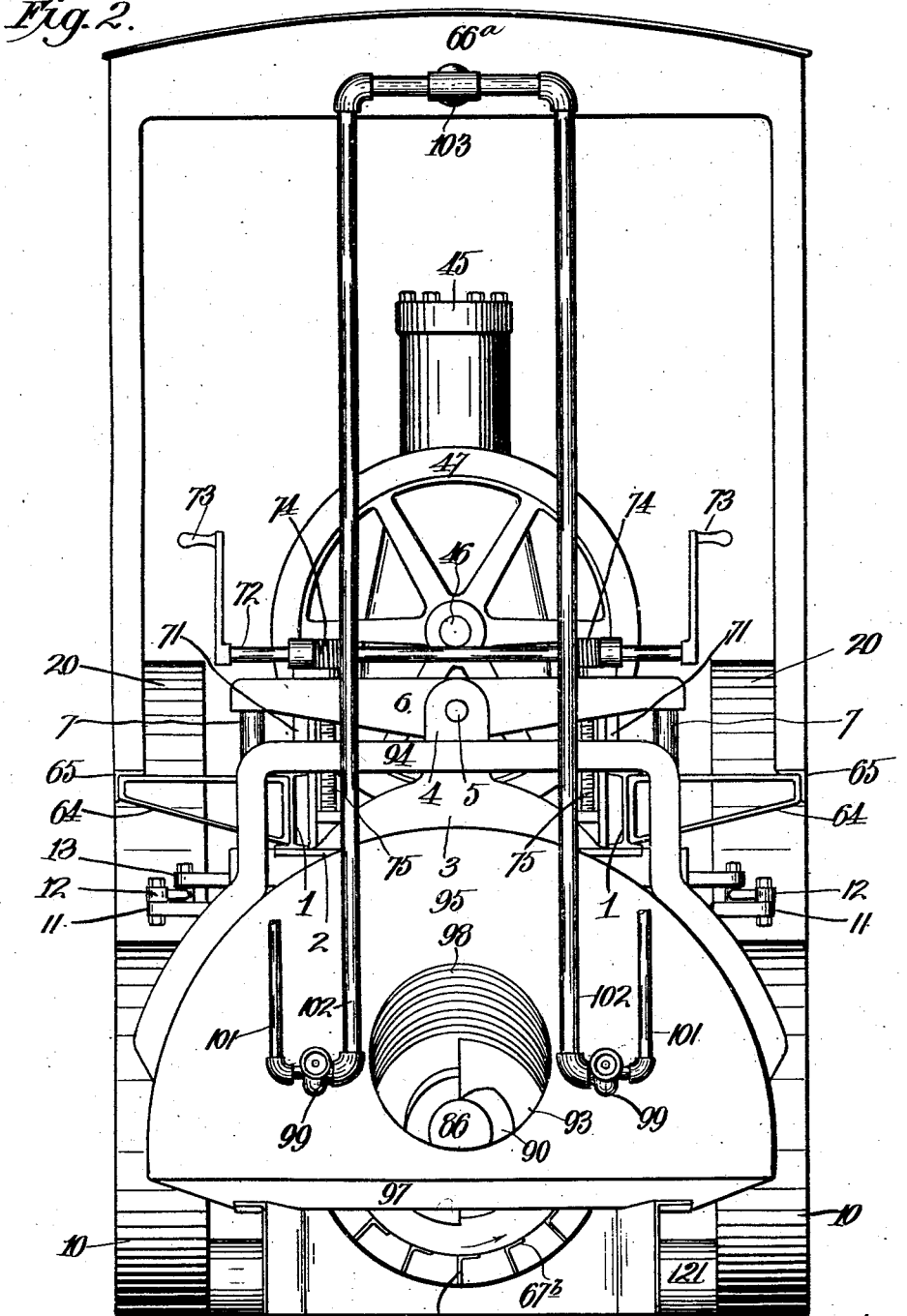

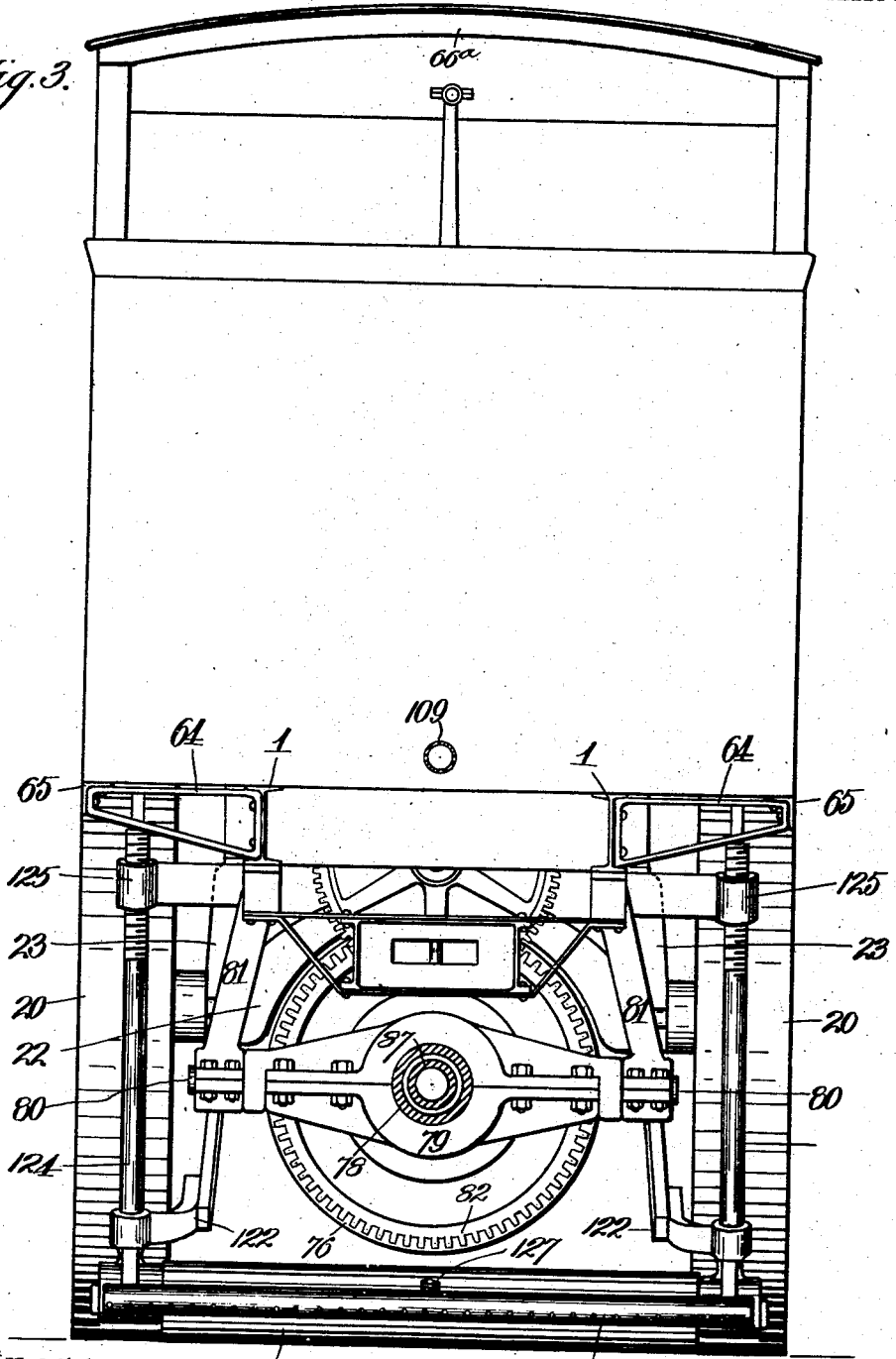

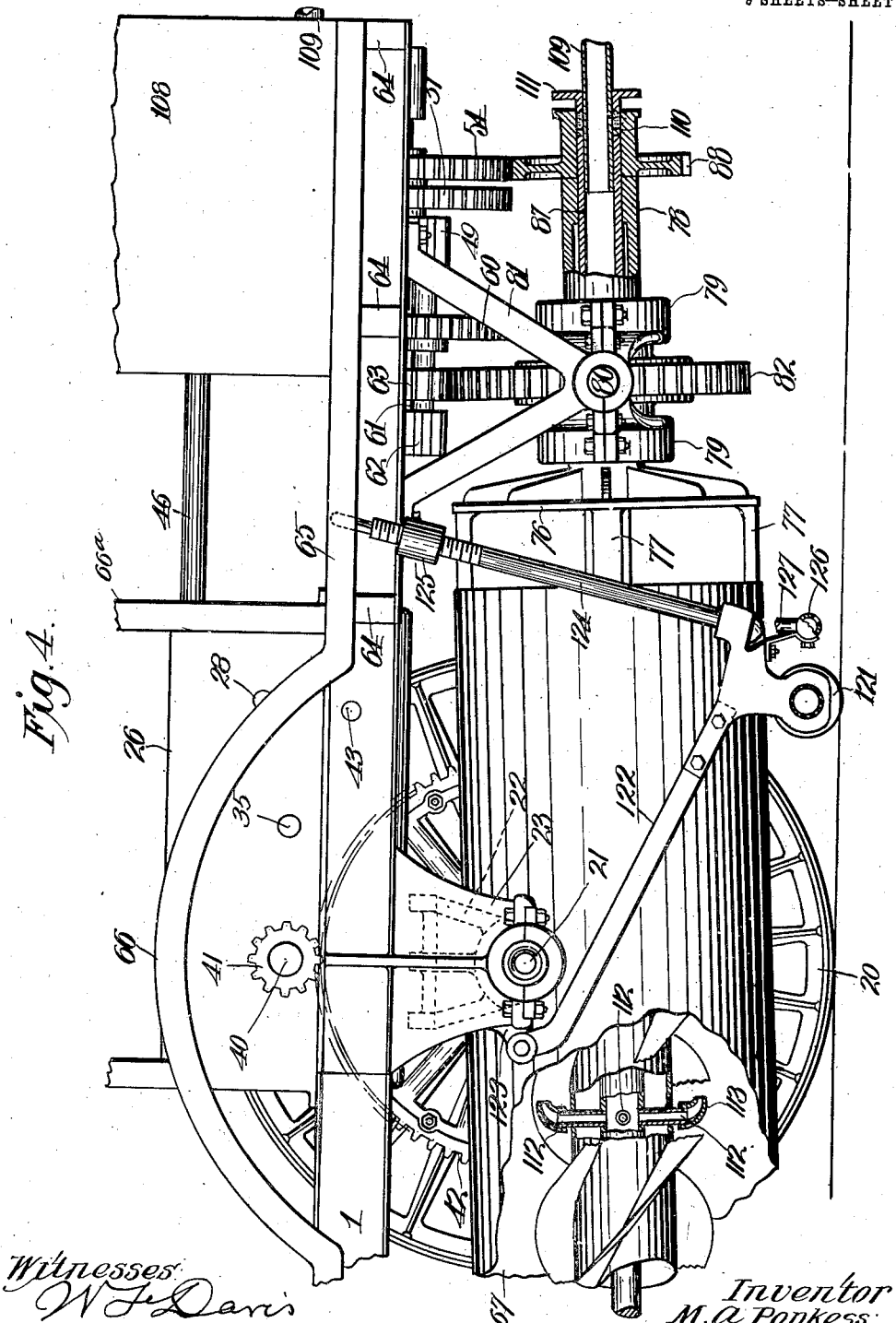

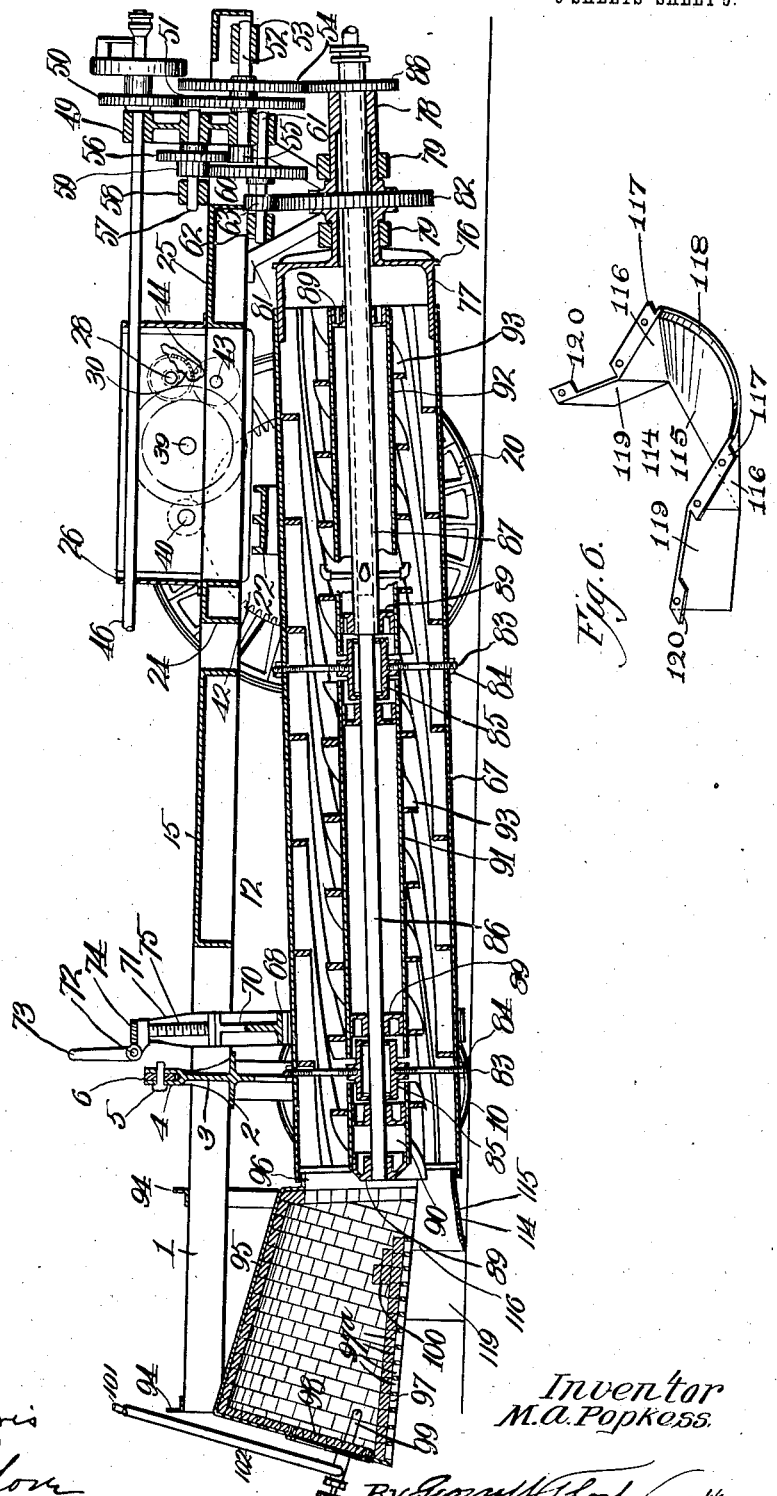

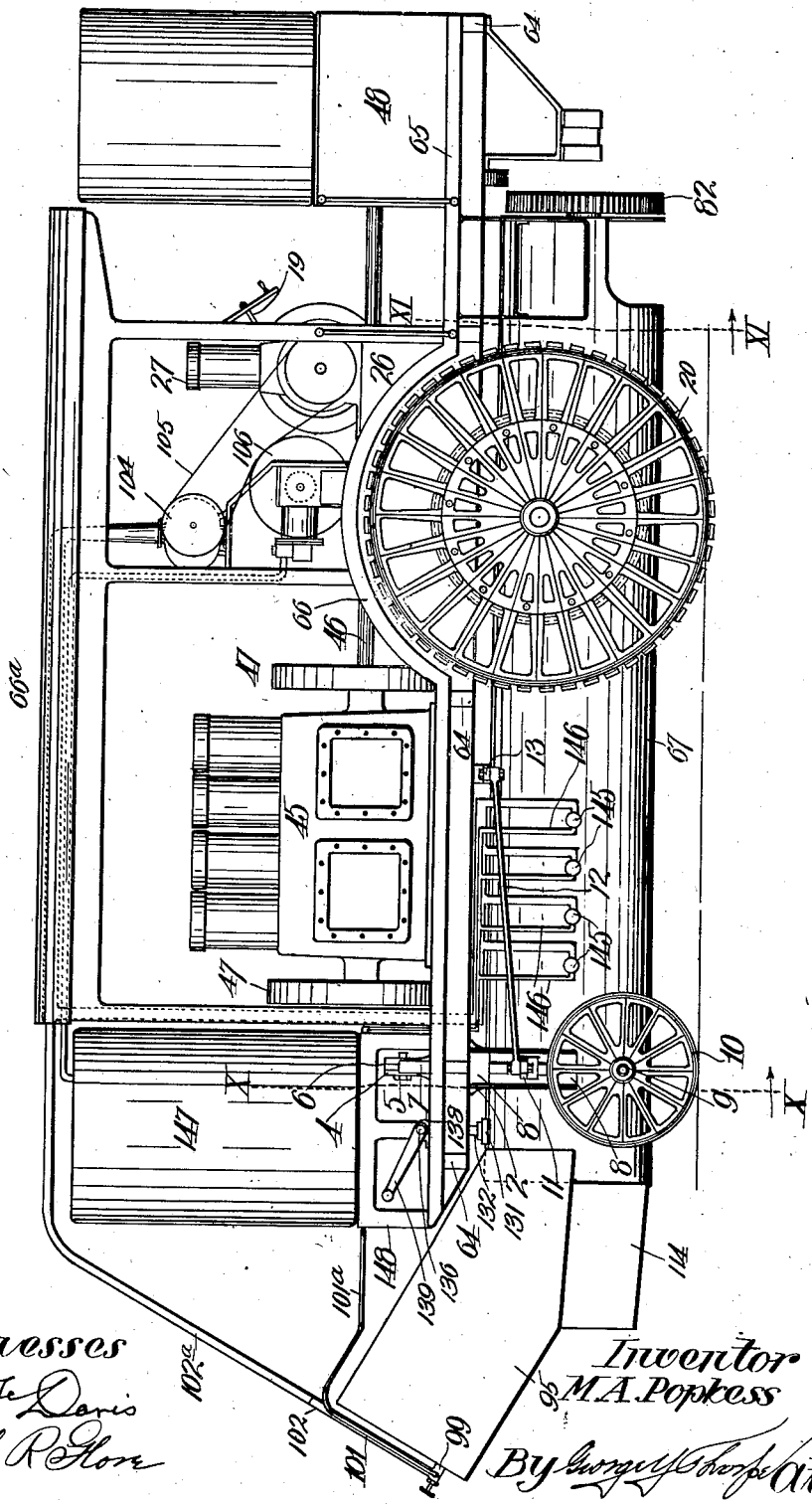

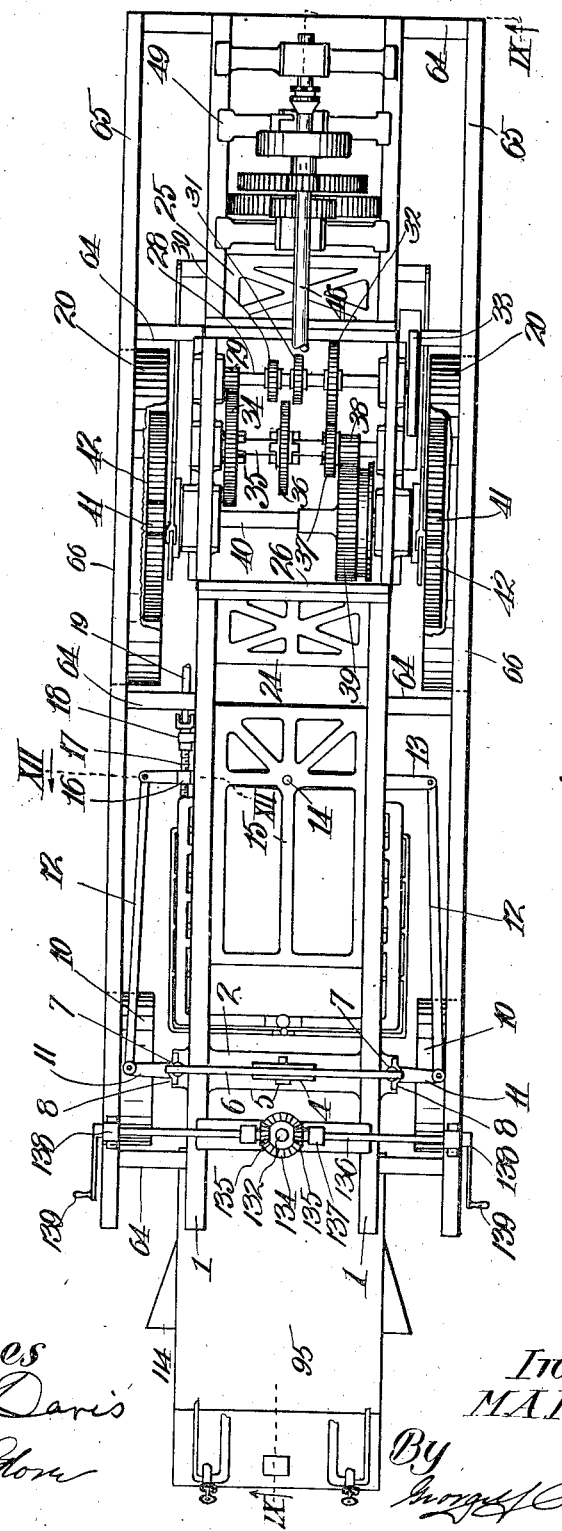

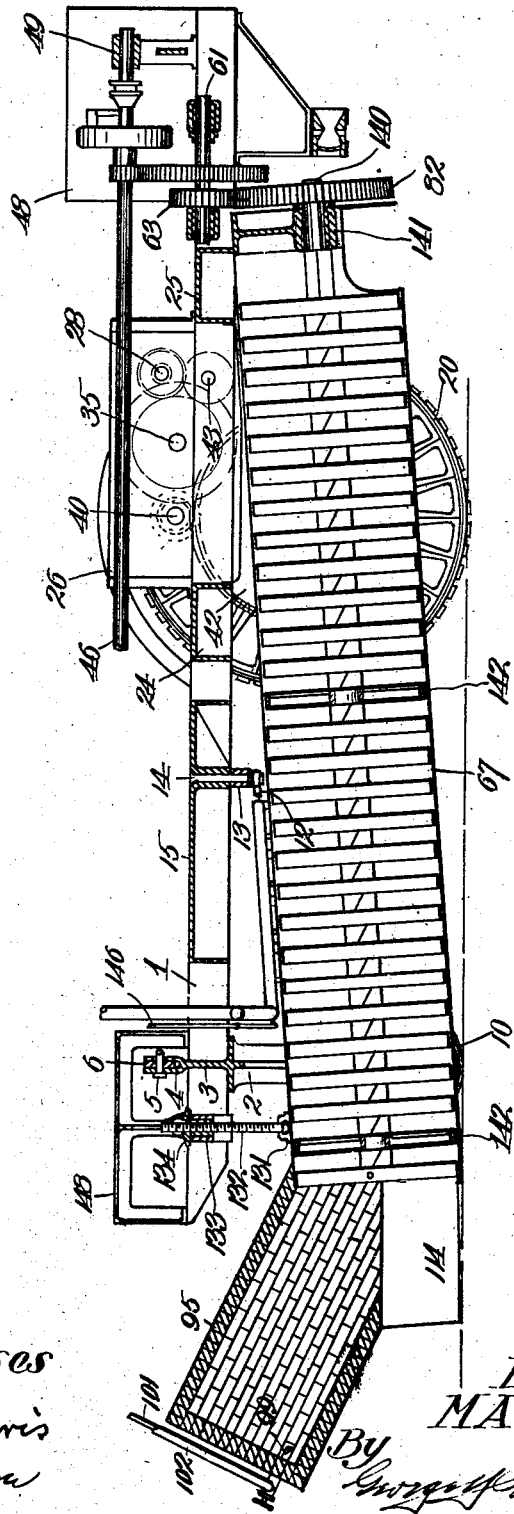

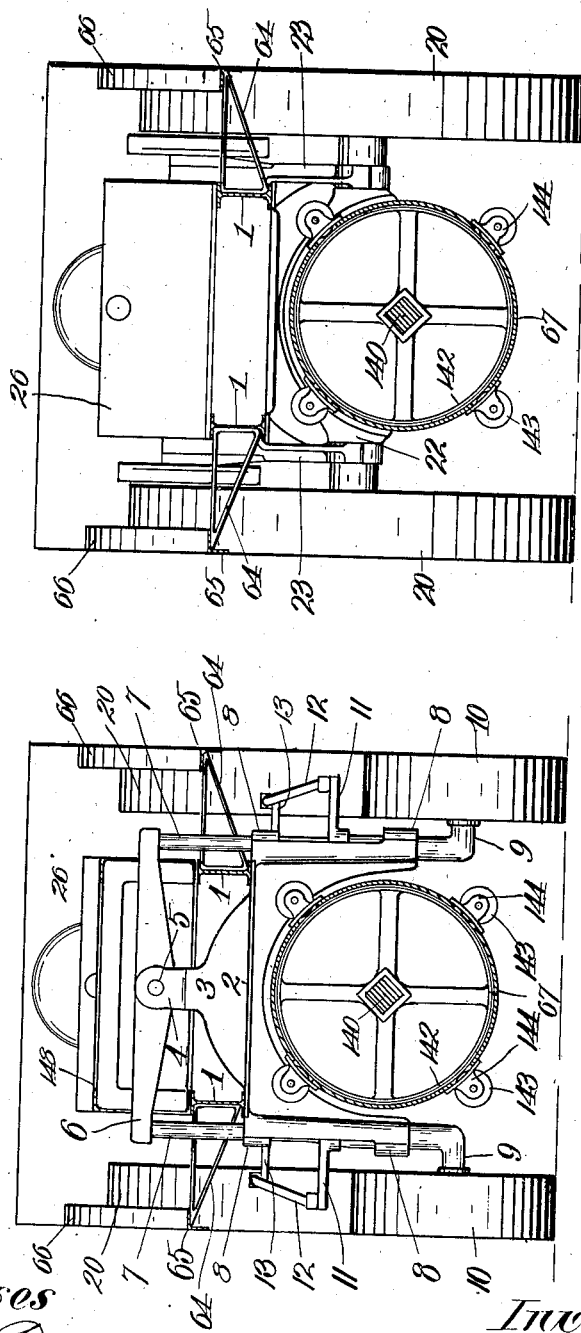

UNITED STATES PATENT OFFICE.

MICHAEL A. POPKESS, OF KANSAS CITY, MISSOURI, ASSIGNOR TO BITUMINIZED ROAD COMPANY, OF PHOENIX, ARIZONA, A CORPORATION OF ARIZONA.

ROAD-MAKING MACHINE.

1,062,113.  Specification of Letters Patent.  Patented May 20, 1913.

Application filed June 28, 1909. Serial No. 504,930.

*To all whom it may concern:*

Be it known that I, MICHAEL A. POPKESS, a citizen of the United States, residing at Kansas City, in the county of Jackson and State of Missouri, have invented certain new and useful Improvements in Road-Making Machines, of which the following is a specification.

This invention relates to pavement making machines wherein paving materials may be combined for the formation of pavements and the like, and more especially to a machine for traveling over the surface to be paved and gathering up material therefrom and thoroughly mixing the same or mixing the material gathered up with other material to produce a plastic mass and then dropping such mass upon the sub-base or surface to be paved.

With these general objects in view and others as hereinafter appear, the invention consists in certain novel and peculiar features of construction and organization as hereinafter described and claimed; and in order that it may be fully understood reference is to be had to the accompanying drawings in which;

Figure 1, is a side elevation of a road-working machine embodying my invention. Fig. 2, is an enlarged front view of the same. Fig. 3, is a rear view on the same scale as Fig. 2 with a part in section on the line III—III of Fig. 1. Fig. 4, is a side elevation of a fragment of a machine with certain parts broken away and others in central vertical section. Fig. 5, is a central longitudinal section on the same scale as Fig. 1 with certain parts omitted and with other parts in a different position of adjustment. Fig. 6, is a detail perspective view of the scraper of the machine. Fig. 7, is a side elevation of a modified form of the machine. Fig. 8, is a top plan view of the modified form of the machine with certain parts omitted. Fig. 9, is a section on the line IX—IX of Fig. 8. Fig. 10, is a section on the line X—X of Fig. 7. Fig. 11, is a section on the line XI—XI of Fig. 7. Fig. 12, is an enlarged section on the line XII—XII of Fig. 8, to show the swiveled relation between a lever and lug hereinafter referred to, of the steering mechanism.

In the said drawings, where like reference characters identify corresponding parts in all of the figures, 1 indicates a pair of parallel I-beams connected near their front ends by a cross-frame or arch 2 provided with an upwardly-projecting web 3 terminating in a bifurcated lug 4 equipped with a pivot 5 on which a rock-bar 6 fitting in the bifurcated lug, is pivotally mounted, said bar bearing at its ends upon a pair of upwardly-projecting arms 7 arranged at opposite sides of beams 1 and journaled in bearings 8 secured to the arch, the lower ends of said arms projecting horizontally outward to form axles 9 on which the front wheels 10 are journaled. The arms 7 are provided with outwardly-projecting crank-arms 11 pivotally connected by links 12 with the opposite ends of a rock-lever 13 pivoted at 14 to a horizontally-arranged casting 15 between and secured in any suitable manner to the I-beams. Outward of one of the beams said lever is equipped with a swiveled lug 16 with which a bolt 17 is engaged, said bolt being journaled in a bearing 18 carried by the adjacent I-beam and universally connected to the rear end of said bolt is a steer-wheel-equipped rod 19. By turning said rod in one direction or the other, lever 13 is rocked accordingly and through links 12 and crank arms 11 turns wheels 10 to steer the machine to the right or the left.

20 indicates the rear wheels of the machine journaled on the ends 21 of an axle or arch 22 having upwardly-projecting arms 23 secured in any suitable manner to the I-beams. Forward or rearward respectively of the vertical plane of the cross-frame or arch 22, the I-beams are connected by cross-frames or castings 24 and 25, and mounted upon said cross-frames or castings is a gear-housing 26 surmounted by an engine 27 geared in any suitable manner, not shown, to operate the transverse shaft 28 journaled in the housing, the said shaft being equipped with gear wheels 29, 30, 31, 32 and 33, the last-named being disposed externally of the housing.

Gear wheel 29 meshes with a larger gear wheel 34 journaled on a transverse shaft 35 also journaled in the housing, said shaft being also equipped with a gear wheel 36 which rotates with but is capable of being shifted along the length of said shaft. Shaft 35 is also equipped with a journaled gear 37 and a rigid gear 38, the last-named gear meshing with a differential gear 39 of any suitable or preferred construction, mounted on a transverse shaft 40 also journaled in the housing and equipped at its extremities with gear pinions 41 meshing with large gear wheels 42 secured to the inner sides of the rear wheels 20.

43 is a transverse shaft below shaft 28 and journaled in the I-beams and provided with a reverse gear 44 meshing with gear 30 of shaft 28.

To propel the machine forward at slow speed, the operator through a suitable lever, (not shown because of common and well known type) shifts gear 36 to the right until it interlocks through suitable clutch mechanism not detailed or specially described. As this interlock relation between gears 34 and 36 is established, shaft 35 begins to rotate and through the other intermediate connections described, pinions 41 impart rotation to gear wheels 42 and hence to the rear carrying or ground wheels 20, the shaft 43 being driven backward, through its connection with shaft 28. To drive the machine at intermediate speed the shift gear 36 is thrown into engagement with gear wheel 31 of shaft 28. To propel the machine at its greatest speed, the shift gear is shifted to the left until it interlocks with gear wheel 37 meshing with the large gear wheel 32 of shaft 28. To drive the machine backward the shift gear 36 is adjusted until it meshes with gear wheel 44 of shaft 43.

45 is an engine mounted on the cross-frame or casting 15 and the I-beams 1, said engine being of any suitable type and shown as having its shaft 46 extending longitudinally of the machine and equipped with a pair of fly-wheels 47 depending between the I-beams at the front and rear ends of said frame 15, frame or casting 24 being spaced from frame 15 to accommodate the rearmost fly-wheel. The rear end of the engine shaft 46 is journaled in any suitable manner in a gear housing 48 mounted on the rear ends of the I-beams, and in a bearing 49 secured in any suitable manner to said beams. Shaft 46 is equipped near its rear end with a gear pinion 50 meshing with a gear wheel 51 secured on a short shaft 52 journaled in bearing 49 and in a bearing 53 carried by the I-beams. Said shaft 52 is also provided with a gear wheel 54 for a purpose hereinafter explained, and with a pinion 55 meshing with a gear wheel 56 on a short shaft 57 journaled in bearing 49 and a bearing 58 carried by the I-beams, shaft 57 being also equipped with a pinion 59 meshing with gear wheel 60 on a short shaft 61 journaled in bearing 49 and in a bearing 62 carried by the I-beams, said shaft being also equipped with a gear pinion 63 for a purpose which hereinafter appears. 64 indicates a plurality of brackets projecting outward from the I-beams and forming supports for a pair of longitudinal angle bars 65 which occupy the vertical plane of the outer sides of the wheels and are arched upwardly over the rear ones as at 66. These angle bars are adapted to form a support for a flooring, omitted to avoid hiding operative parts of the machine, and also for a canopy 66a, if it is desired to equip the machine with a canopy.

67 is a shell preferably in the form of and hereinafter termed a cylinder except in the claims, said cylinder being arranged longitudinally and centrally between the wheels and below the arches 2 and 22. In sheets 1 to 5 inclusive, the cylinder near its front end fits loosely in a yoke, 68, equipped at intervals with antifriction rollers 69 peripherally engaging the cylinder. The yoke is provided with an upwardly-projecting portion 70 flanked at each side by standards 71 projecting upward from I-beams 1, and journaled in the upper ends of said standards, is a transverse worm-shaft 72 provided with crank handles 73, said worm-shaft meshing with worm-wheels 74 secured on the upper ends of a pair of vertical screws 75 journaled in the standards and engaging the yoke for the purpose of raising or lowering the same and hence the front end of the cylinder 67. The rear end of the cylinder is secured on the forwardly-projecting arms 77 of a circular disk 76 rigid with a sleeve 78 journaled in a pair of bearings 79 provided with laterally-projecting trunnions 80 journaled in V-shaped hangers 81 depending from the I-beams. Sleeve 78 is equipped with a rigid gear wheel 82 meshing with gear pinion 63 whereby the cylinder is rotated slowly.

83 indicates two sets of threaded rods extending into the cylinder radially thereof and engaged at their outer ends by nuts 84. At their inner ends they support cylindrical bearings 85 for a longitudinal shaft consisting of a front portion 86 extending from the front end of the cylinder to a point slightly beyond the rear bearing 85 and a rear portion 87 which is tubular and rigidly secured at its front end on the rear end of shaft portion 86, portion 87 being journaled at its rear end in sleeve 78 and equipped at the rear end of said sleeve with a gear wheel 88 meshing with gear wheel 54 when the cylinder is in operative position, that is, is extending downward and forward as shown in Fig. 5.

89 indicates collars secured to said shaft and secured on said collars so as to turn with said shaft is an earth agitator, consisting of a sectional hollow hub comprising parts 90, 91 and 92 provided with peripheal blades 93 of spiral form, by preference.

From the foregoing it will be seen that the engine 45 is instrumental in simultaneously rotating the cylinder and the earth agitator in the same direction, the former slowly and the latter at a high rate of speed. It will also be understood that through the instrumentality of shaft 72 and the worm gearing described, the front end of the cylinder may be vertically raised or lowered, and in this connection it is to be understood that the elevation or depression of the front end of the cylinder does not disturb the operative relation existing between pinion 63 and gear wheel 82 but does throw gear wheel 88 out of or into engagement with gear wheel 54, though it is obvious that the teeth of said last-named gear wheels may be of sufficient size to accommodate the movement of gear wheel 88 without throwing the same entirely out of mesh with gear wheel 54.

94 is a pair of angle-iron arches secured to and depending from I-beams 1, and secured to said arches forward of the cylinder is a preferably fire-brick-lined oven 95 of approximately semi-cylindrical form and terminating at its rear end in a flange 96 snugly embraced by the upper half of the front end of the cylinder when depressed, the flat bottom 97 of the oven terminating by preference slightly forward of the front end of the cylinder, the bottom being formed with openings 97ª to admit air to support combustion. The oven is provided with a door-controlled opening 98 in its front end to give access to the interior of the oven and at opposite sides of said opening it is provided with a pair of burners 99 for directing a flame toward the front end of the cylinder, the bottom of the oven being provided by preference with a fire-brick abutment 100 to intercept the flame and thus prevent the same impinging forcibly on the front end of the earth-agitator. The burners are supplied with liquid fuel such as oil by pipes 101 connected to a suitable oil tank, not shown, in Figs. 1 to 5 inclusive which may be carried by the wheeled frame, and are also supplied with air to atomize the oil by pipes 102 connected to a pipe 103 leading from a suitable blower 104 driven by a belt connection 105 between the blower and engine 27, the belt of such connection 105 also frictionally engaging and operating an air pump 106 connected by a pipe 107 to a binder receptacle 108 movable with the machine and shown as mounted on the machine though it may be otherwise carried.

The binder receptacle is provided with a discharge pipe 109 fitting in the tubular shaft portion 87 and in the hub of gear wheel 88 and said discharge pipe is provided at the rear end of said shaft portion with an external flange 110 against which any suitable packing is adapted to be clamped by a packing gland 111, the pipe 109, flange 110, gland 111 and the packing forming conjointly a stuffing box which guards against any of the binder which will be in liquid form, from leaking out around the discharge end of pipe 109. The binder passes forwardly through the tubular shaft portion until checked by the rear end of the solid shaft portion 86 and thence passes outward through the radial jet-pipes 112 provided with nozzles 113 at their outer ends, these nozzles being adapted to discharge the liquid binder rearwardly and outwardly through centrifugal force, for the purpose of effecting a thorough mixture of the binder with the agitated heated earth passing through the cylinder as hereinafter explained.

114 is a scraper consisting of a body-portion 115 of arcuate form at its rear end and flat or straight form at its front end and diverging from its rear to its front end and provided at its side or diverging margins with upwardly-projecting side walls 116 equipped with outwardly-projecting wings 117 to be bolted or otherwise rigidly secured to the oven at opposite sides of the rear end of the bottom thereof, the rear end of portion 115 of the scraper terminating in a flange 118 snugly embraced by the lower half of the front end of the cylinder, and projecting divergingly forward from the walls 116 are gathering arms or wings 119 provided with outwardly-projecting flanges 120 by which they are secured to the bottom of the oven, and in this connection it is to be understood that the scraper is in use only when the cylinder is depressed and that it is removed to permit the front end of the cylinder to be reëlevated.

For compacting the bed of earth from which the loose earth or material is gathered up, before the plastic mass is dropped thereon at the rear end of the cylinder, I provide a roller 121 arranged below the cylinder near its rear end and journaled in the rear and lower ends of a pair of swing-arms 122 extending upward at opposite sides of the cylinder and pivoted to lugs 123 of arms 23 of axle or arch 22. 124 are screws journaled at their lower ends in swing-arms 122 and engaging threaded arms 125 secured to and projecting outward from the hangers 81, a wrench being adapted to be applied to the upper end of said screws for the purpose of effecting a slight vertical adjustment of roller 121 in order that more or less of the weight of the machine may be brought to bear upon said roller to cause it to perform its function of compacting the bed or subbase preliminary to the discharge thereon of the plastic mass by the cylinder.

126 is a transversely arranged perforated binder-distributing pipe underlying the cylinder rearward of the roller and supported from the arms 122, 127 indicating a pipe to supply binder to said perforated pipe in order that the latter may be utilized to give the sub-base a coating of binder which will cause the plastic material to adhere more firmly to the sub-base and in a large measure prevent moisture passing upward by capillary attraction from such sub-base into the surfacing thereon.

From the foregoing description it will be understood that when paving material is delivered to the cylinder and rotation is imparted to the same, and to the agitator, the material will be finely broken up, thoroughly mixed and discharged, the operation being continued as long as material is supplied and the parts mentioned are caused to rotate, independently of the travel of the machine. The preferred method of operation is to turn the earth to be treated in a ridge, lower the front end of the cylinder to operative position, attach the scoop and with the cylinder and agitator revolving, advance along the ridge longitudinally, the wings 119 gathering the loose earth and concentrating it in the path of the scoop through which it passes into the slowly revolving cylinder. As it enters the same and during its entire passage therethrough it is subjected to a blast of heat generated preferably within the combustion chamber and passing through the cylinder. This loose earth thus gathered into the cylinder is raised and incidentally forced rearwardly by the spirally-arranged or equivalent internal cleats 67$^a$ of the cylinder, the raising of a small volume of the earth by each of said cleats being insured by the equipment of the cleats with a small flange or ledge 67$^b$ at their inner edges. Because of these flanges or ledges earth is being dropped toward the bottom of the cylinder from the time it is picked up by the cleats until the latter have passed over the axial line of the cylinder and as it falls it comes in contact with the wings of the rapidly-revolving agitator which tends to insure its complete and thorough breaking up and to compel it to travel or whirl laterally rearwardly through the cylinder, the centrifugal force of the agitator being such as to finely divide and thoroughly mix the material as it passes through the cylinder.

In the midst of the finely divided material whirling through the cylinder, the liquid binder is sprayed, the spraying device whirling with the earth agitator for the purpose of thoroughly distributing or spraying the binder throughout the mass of finely divided earth, it being understood that this earth being highly heated by the hot air passing through the cylinder and whirling therein under the influence of the cylinder and the earth agitator, is in the best possible condition to receive and become saturated with the liquid binder and continued agitation of the material after receiving the liquid binder insuring the thorough and substantially uniform distribution of such binder with the finely divided earth or material. The product of such mixture is in the form of a dense plastic mass which falls from the cylinder between the arms 77 of disk 76 and is afterward leveled and compacted down upon the underlying solid bed of earth, any suitable instrumentalities being employed to level and evenly distribute and pack such plastic mass to the required density, an ordinary street roller being preferably employed to give a smooth and even finish to this surfacing.

When it is desired to transport the machine from one field of operation to another, the scraper and roller are removed and the cylinder is swung upward on pivots 80 so as to clear ordinary obstructions in the roadway. By running the wheels of the machine on the sub-base or solid bed of earth from which the loosened earth has been turned into a ridge, the necessity of pitching the scraper and the cylinder at an undesirable angle is avoided. It will thus be seen that by lifting the earth only a slight distance and holding the cylinder inclined at a slight angle, less power will be required for the operation of the cylinder and the agitator.

In Figs. 7 to 11 inclusive, the cylinder is not adapted for rotation and the scraper and oven bear a fixed relation to the cylinder to move vertically with the latter when tilted downward to operative or upward to inoperative position. Because of the fact that the cylinder does not rotate the means for raising it and lowering it may be of simpler and cheaper construction than that employed for raising and lowering the rotating cylinder. To accommodate the vertical movement of the oven the oil and air supply pipes for the burner are provided with flexible sections 101$^a$ and 102$^a$, and the train of gearing for rotating the cylinder is of course dispensed with. The construction shown in Figs. 7 to 11 inclusive also embodies a modified means of charging the agitated heated earth passing through the cylinder with the binder in liquid condition. Referring now to said figures in detail 131 is a perforated hollow casting secured to the upper side of the cylinder near its front end and secured in said casting is an inverted bolt 132 extending through a cross bar 133 connecting I-beams 1, and secured upon the bolt above the cross bar is a beveled gear wheel 134 meshing with a pair of beveled pinions 135 on the inner ends of transverse shafts 136 journaled in bearings 137 of the cross bar and 138 of angle irons 65, said shafts being provided with crank handles 139 at their outer ends whereby the front end of the cylinder may be vertically raised or lowered.

140 is a shaft extending longitudinally through and axially of the cylinder and journaled at its rear end in a pivoted bearing 141, corresponding substantially to one member 79 of the pivoted bar of the construction disclosed by Figs. 1 to 5 inclusive. At suitable points within the cylinder the shaft is rigidly provided with skeleton concentric rings 142 of slightly less diameter than the internal diameter of the cylinder so as to be capable of turning in the latter without friction, and peripherally engaging said rings is a series of antifriction rollers 143 projecting through the cylinder and journaled in brackets 144 secured to and externally of the cylinder. By this arrangement the earth-agitator is permitted to rotate and perform its proper function and maintain its proper relation with respect to the cylinder although the latter is stationary as regards rotatable movement, it being noticed that the earth-agitator is driven by the gear-wheel 82 meshing with the pinion 63 of shaft 61, as in the type of construction hereinbefore described.

To charge the agitated earth within the stationary cylinder with a binder in liquid condition a series of jet-pipes or injectors 145 project into the cylinder, such injectors being supplied by oil pipes 146 connected to the oil tank 147 mounted upon the bracket 148 at the front end of the machine, it being understood that pipes 101 for supplying oil to burners 99 are also connected in the construction shown by Figs. 7, to tank 147. The structures shown by Figs. 1 to 5 and 7 to 11 are substantially the same except in the particulars hereinbefore noted and the type last described is lowered substantially the same as that first described.

From the above description it will be apparent that I have produced an automatic paving machine embodying the features of advantage enumerated in the statement of the object of the invention and I wish it to be understood that I reserve the right to make such changes in the form, proportion, detail construction and arrangement of the parts as properly fall within the spirit and scope of the appended claims.

Having thus described the invention what I claim as new and desire to secure by Letters-Patent, is:—

1. A road-working machine, comprising a frame, ground-engaging supports therefor, a shell extending longitudinally of the machine and pivotally supported at its rear end from said frame, means for depressing and elevating the front end of the shell, means in advance of the shell to gather up loose earth in its path for delivering it into the shell, means for rotating the shell, a rotary agitator within the shell, and means to revolve the agitator at a higher rate of speed than the shell.

2. A road-working machine, comprising a frame, ground-engaging supports therefor, a shell extending longitudinally of the machine and pivotally supported at its rear end from said frame, means for depressing the front end of the shell, means in advance of the shell to gather up loose earth in its path for delivering it into the shell, means for rotating the shell, a rotary agitator within the shell, means to revolve the agitator at a higher rate of speed than the shell, and means to generate heat and discharge it into the shell at the front end thereof.

3. A road-working machine, comprising a frame, ground-engaging supports therefor, a shell extending longitudinally of the machine and pivotally supported at its rear end from said frame, means for depressing the front end of the shell, means in advance of the shell to gather up loose earth in its path for delivering it into the shell, means for rotating the shell, a rotary agitator within the shell, means to revolve the agitator at a higher rate of speed than the shell, means to generate heat and discharge it into the shell at the front end thereof, and means for spraying a binder in liquid condition into the agitated earth within the shell.

4. A road-working machine, comprising a frame, ground-engaging supports therefor, a shell extending longitudinally of the machine and pivotally supported at its rear end from said frame, means for depressing the front end of the shell, means in advance of the shell to gather up loose earth in its path for delivering it into the shell, means for rotating the shell, a rotary agitator within the shell, means to revolve the agitator at a higher rate of speed than the shell, means to generate heat and discharge it into the shell at the front end thereof, means for spraying a binder in liquid condition into the agitated earth within the shell, and means underlying the rear or elevated end of the shell for compacting the earth upon which fall the discharge from the rear end of the shell.

5. A road-working machine, comprising a wheeled-frame, a rotatable shell arranged longitudinally thereof and provided with internal cleats and pivotally supported from said frame at its rear end, means for depressing and raising its front end, a scraper supported at the front end of the shell and adapted to gather up loose earth and deliver the same into the shell slowly, a shaft extending axially through the shell and journaled, a rotary earth agitator mounted on said shaft and rotatable therewith, and means for spraying a binder in liquid condition into the earth as the same is agitated and forced through the shell toward its rear end.

6. A road-working machine, comprising a wheeled-frame, a rotatable shell arranged longitudinally thereof and provided with internal cleats and pivotally supported from said frame at its rear end, means for depressing and raising its front end, a scraper supported at the front end of the shell and adapted to gather up loose earth and deliver the same into the shell slowly, a shaft extending axially through the shell and journaled, a rotary earth agitator mounted on said shaft and rotatable therewith, means for spraying a binder in liquid condition into the earth as the same is agitated and forced through the shell toward its rear end, and means underlying the rear or elevated end of the shell to compact the earth upon which falls the discharge from the rear end of the shell.

7. A road-working machine, comprising a wheeled-frame, a rotatable shell arranged longitudinally thereof and provided with internal cleats and pivotally supported from said frame at its rear end, means for depressing and raising its front end, a scraper supported at the front end of the shell and adapted to gather up loose earth and deliver the same into the shell slowly, a shaft extending axially through the shell and journaled, a rotary earth agitator mounted on said shaft and rotatable therewith, means for spraying a binder in liquid condition into the earth as the same is agitated and forced through the shell toward its rear end, and a transverse roller underlying the rear end of the shell to compact the earth discharged from the rear end of the shell down upon the underlying bed of solid earth.

8. A road working machine, comprising a frame, wheels supporting the same, a rotatable shell arranged longitudinally of the frame between the wheels and pivotally supported at its rear end, means whereby the front end of the shell may be depressed and elevated, a suitably journaled shaft extending longitudinally through the shell and comprising a solid front portion and a tubular rear portion rigidly connected together, the front portion forming a closure for the front end of the tubular or rear portion, an earth-agitator journaled upon said shaft within the shell, jet-pipes extending through the agitator and communicating at their inner ends with the tubular portion of the shaft and provided at their outer ends with nozzles, a scraper at the front end of the shell, means to generate heat and discharge it rearwardly into the front end of the shell, means for driving the shell and said shaft at varying speeds in the same direction, and means for transmitting motion to the rear wheels to propel the machine.

9. In a pavement making machine, the combination of a supported portable shell, means to gather up material from the surface to be paved as the machine is moved and deliver it into the shell, an agitator within said shell to finely divide and stir the material and cause it to be discharged from said shell and means to spray the sub-surface from which said material was lifted, with a liquid binder.

10. In a pavement making machine, the combination of a supported rotary shell, means to deliver paving material therein, an agitator within the shell to finely divide such material and cause it to pass through the shell and drop upon the surface to be paved, means to smooth and compact such surface preliminary to its reception of such material, and means to discharge a liquid binder upon the smoothed surface before such paving material drops thereon from the shell.

11. In a pavement making machine, the combination of a supported rotary shell, means to deliver paving material therein, an agitator within the shell to finely divide such material and cause it to pass through the shell and drop upon the surface to be paved, means to heat such paving material while within the shell, and means to discharge a liquid binder upon the sub-surface before such paving material drops thereon from the shell.

12. In a pavement making machine, the combination of a supported rotary shell, means to deliver paving material therein, an agitator within the shell to finely divide such material and cause it to pass through the shell and drop upon the surface to be paved, means for spraying a liquid binder into the paving material within the shell, and means to discharge a liquid binder upon the sub-surface before such paving material drops thereon from the shell.

13. In a pavement making machine, the combination of supported rotary shell, means to deliver paving material therein, an agitator within the shell to finely divide and mix such material and cause it to pass through the shell and drop upon the surface to be paved, means for heating and means for spraying a liquid binder into such material within the shell, and means to discharge a liquid binder upon the sub-surface before such paving material drops thereon from the shell.

In testimony whereof I affix my signature, in the presence of two witnesses.

MICHAEL A. POPKESS.

Witnesses:
H. C. RODGERS,
G. Y. THORPE.